Oct. 26, 1948.  O. M. GAHAGAN  2,452,451
AUTOMATIC CATHEAD
Filed March 23, 1945  2 Sheets-Sheet 1
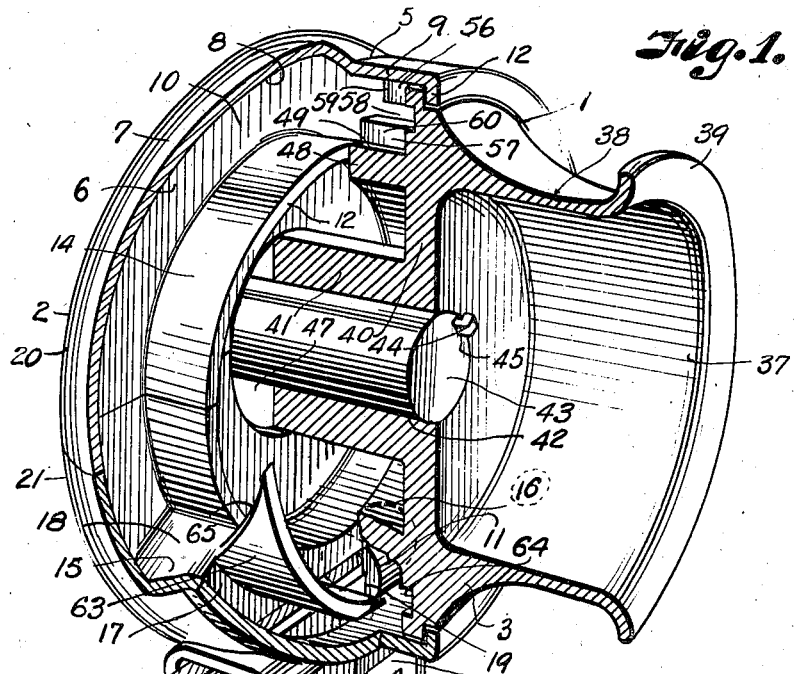
INVENTOR.
Orren M. Gahagan.
BY
Fishburn & Mullendore
ATTORNEYS

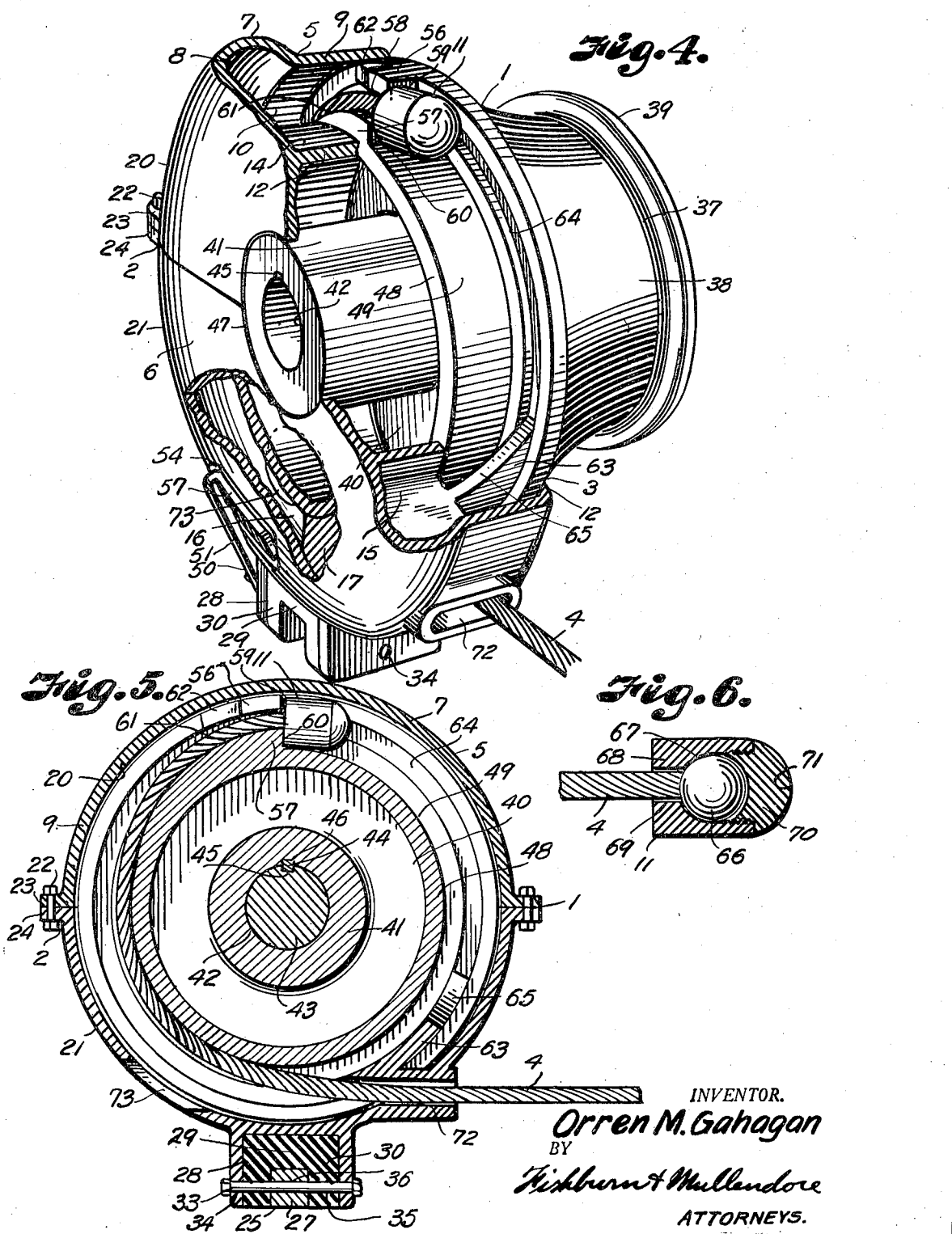

Patented Oct. 26, 1948

2,452,451

UNITED STATES PATENT OFFICE 2,452,451

AUTOMATIC CATHEAD

Orren M. Gahagan, Dallas, Tex.

Application March 23, 1945, Serial No. 584,342

12 Claims. (Cl. 254—173)

1

This invention relates to a device ordinarily known as an automatic cathead such as used on drilling machinery in conjunction with tongs for breaking and setting up threaded joints of tubing, casing, tool joints of drill pipe, and similar connections.

The principal objects of the invention are to provide an automatic cathead having an extremely simple compact structure, which is durable in operation and which has relatively few parts.

Other objects of the invention are to provide a structure capable of effecting a long stroke on the jerk line but which is of relatively small diameter; to provide a cathead embodying laterally related stator and rotor members for respectively supporting and transmitting power to a jerk line; to provide structure of this character which facilitates transfer of the line to and from the rotor without danger of wedging or jamming of the jerk line or the clutch element thereon; to provide a cathead with a jerk line having a swivelly mounted clutch element to avoid twisting of the line and for reducing wear thereon; and to provide a cathead with a resilient mounting for the stator so as to absorb impacts incidental to application of power and release thereof from the jerk line.

In accomplishing these and other objects of the invention hereinafter pointed out, I have provided improved structure, the preferred form of which is illustrated in the accompanying drawings wherein:

Fig. 1 is a perspective view partly in section of an automatic cathead embodying the features of the present invention.

Fig. 2 is a longitudinal section through the cathead.

Fig. 3 is a fragmentary section on the line 3—3 of Fig. 2.

Fig. 4 is a perspective view of the cathead partly in section and viewed from the side opposite that shown in Fig. 1.

Fig. 5 is a cross section on the line 5—5 of Fig. 2 but illustrating power being applied to the jerk line.

Fig. 6 is an enlarged section through the clutch element of the jerk line, particularly illustrating the swivel mounting thereof.

Referring more in detail to the drawings:

1 designates an automatic cathead ordinarily adapted to be mounted on the line shaft of a draw works or similar equipment used in drilling rigs for breaking loose and setting up tool joints of drill pipe, couplings of casing, tubing, and similar threaded connections encountered in drilling

2 operations. The cathead 1 includes a relatively fixed or stator or jerk line supporting member 2 and a rotor or driving member 3 for applying power to a jerk line 4.

The stator 2 includes a housing 5 having a disklike end wall portion 6 terminating at the periphery in a guard 7 comprising an annular grooved track portion 8 and a laterally extending annular track portion 9. The grooved track portion 8 of the guard cooperates with a concentric inner flange 12 to form a way 10 through which the clutch element, illustrated as a knob 11 on the jerk line 4 is adapted to move as later described. The guard 7 terminates at the free edge in an inwardly extending annular lip 13. The flange 12 has an inner annular face forming a track 14 within the inner circumference of the way 10 on which the knob is returned from a check station indicated at 15 to a rest station indicated at 16. The check and rest stations are formed by a stop 17 extending outwardly from the flange 12 to the groove portion 8 of the guard 7 at a point adjacent the lower front portion of the stator and which provides check and rest faces 18 and 19 at ends of the tracks 8 and 14, for purposes later described.

To facilitate assembly, the stator is preferably formed in complementary sections 20 and 21 connected together on the horizontal diameter of the stator by fastening devices 22 extending through ears 23 and 24 on the respective sections as best shown in Fig. 5. The stator is adapted for substantially fixed but resilient mounting on bracket 25 having a plate portion 26 which may be attached to a jackpost (not shown) of the rotary drill works (not shown). The bracket also has a horizontally extending arm 27 carrying a resilient pad 28 having a portion 29 extending across the arm and depending portions 30 at the sides of the arm as best shown in Fig. 5. The resilient pad is engaged between spaced ears 31 and 32 extending from the periphery or guard portion of the stator. The stator is secured to the bracket by a fastening device such as a bolt 33 projected through openings 34 in the ears, registering openings 35 in the portions 30 of the resilient pad, and through an opening 36 in the arm of the bracket to retain the parts in assembly.

The rotor 3 includes a spool 37 having a substantially frustro-conical body to provide a tapering face 38 preferably curved in the direction of taper to accommodate a catline thereon. The spool 37 has an annular end flange 39 extending circumferentially of the smaller end of the frustro-conical body to prevent running off of the catline, and an inwardly extending web 40 at the base thereof which carries a laterally extending hub 41. The hub 41 has a bore 42 for mounting on the line shaft 43 of the draw works, the hub being secured by a key 44 engaged in registering ways 45 and 46 in the shaft and hub respectively. The hub 41, including the web 40, substantially conforms to the width of the stator and the outer end extends loosely through an opening 47 in the end wall 6 of the stator as illustrated in Figs. 2 and 4. Extending inwardly from the web 40 into the stator is a flange 48 having a circumferential face 49 substantially registering with the face of the track 14 of the flange 12 as shown in Fig. 2 and on which the jerk line is adapted to be wound when the knob is transferred from the rest station 16 onto the face 49 of the flange 48 of the rotor. The knob is transferred by a transfer mechanism 50 including a lever arm 51 pivotally mounted on a cross pin 53 carried by an ear 52. The upper end of the lever operates in a slot 54 in the stator and carries a laterally extending arm 55 substantially coextensive with the rest station 16 and which is adapted to move the knob of the jerk line from the rest station 16 within the way 10 onto the lateral track of the rotor so that it overlies the flange 48 of the rotor and is in position to be engaged by a pickup on the rotor.

The pickup includes a pair of lugs 56 and 57 extending inwardly from the web 40 of the rotor and spaced apart as at 58 to accommodate the jerk line therebetween. The lugs 56 and 57 are in radial alignment as shown in Fig. 5 and have knob engaging faces 59 and 60 in the direction of rotation to engage the knob of the jerk line and carry the line around the face 49 on the flange 48 of the rotor as shown in Fig. 5.

To facilitate entrance of the line between the lugs and avoid any possibility of jamming the knob or line between the rotor and stator, the outermost lug 56 is shorter than the lug 57, as shown in Fig. 2. In order to avoid a sharp bend in the line where it passes over the inner lug 57, the lug includes a ramp 61 which rounds into the circumference of the flange 48. The outer lug 56 has the rear face formed as a slanting cam 62 arranged to deflect the knob from the path of the rotor in case of accidental reverse rotation of the line shaft 43.

In order to automatically disengage the knob of the line from the pickup, the stop 17 carries an arcuate shaped deflector 63 extending from the side thereof adjacent the web of the rotor and which is engaged in an annular groove 64 of the rotor, which groove extends between the lugs 56 and 57 as shown in Fig. 4. The end of the deflector opposed to the direction of rotation of the rotor is formed on a slow radius 65 sloping from the groove 64 to the stop 15 so that when the knob engages the slow radius portion 65 of the deflector 63, it is moved thereby onto the track portion 14 of the stator. The knob and line are then free to return to the rest station 16 responsive to backlash in the line or by a pull imparted on the line.

In order to facilitate transfer of the knob of the line into and from the path of the pickup lugs on the rotor and to avoid twisting of the line, the knob is preferably formed so that it swivels on the line. This may be accomplished by providing the end of the line with a ball-shaped head 66 (Fig. 6) that engages in a socket-like recess 67 of a cylindrical body portion 68 of the knob, the line passing through an axial opening 69 in one end of the socket. The other end of the socket is closed by a plug 70 threaded therein and which has a rounded forward end 71 to facilitate disengagement of the knob from the pickup lugs 56 and 57 when the knob engages the deflector face 65. The line is adapted to pass from the stator through a slot-like opening 72 formed in the guard portion thereof as shown in Figs. 1, 4 and 5 to facilitate threading of the line through the opening 72. The guard portion of the stator is provided with an aligning opening 73 (Fig. 4) in the opposite side thereof of sufficient diameter to pass the knob 11.

In assembling the device constructed as described, the sections of the stator are assembled about the hub 41 of the rotor 3 and secured together by the fastening devices 22. The arm 27 of the bracket is secured to the ears 31 and 32 of the stator 2 by the bolt 33 which also retains the resilient pad 28 as shown in Fig. 5. The assembled unit is then mounted on the line shaft 43 of the draw works and secured by the key 44. The end of the jerk line 4 which is to be attached to the tong is passed into the stator through the opening 73 and out through the opening 72 so that the knob on the opposite end thereof is drawn into the rest station 16 with the end of the knob engaging the rest face 19 of the stop 17. The arm of the transfer lever 51 is connected by suitable connection (not shown) with an operating control (also not shown) located in convenient position for the driller.

With the cathead mounted on the line shaft 43, the rotor member rotates with the line shaft 43, but the knob 11 on the jerk line remains in rest position until the jerk line is to be used in operating one of the tongs employed in making up and/or breaking joints. When the jerk line is to be operated, the free end thereof is connected to the tong or wrench in such a manner that the slack is drawn from the line. Power is then applied to the jerk line 4 by operating the transfer lever 51 to move the knob 11 on the line from the rest station 16 onto the track formed by the flange 48 so that it is in position to be engaged by the pickup lugs 56 and 57. Upon engagement of the lugs, the line passes therebetween and the line is wrapped about the face 49 of the flange 48 exerting power on the line to effect initial movement of the tongs. When the rounded end 71 of the knob 11 engages the deflector face 65 it is moved thereby into the check station 15. The jerk line is then free of the rotor and is returned about the track 14 to rest station 16 incidental to backlash on the jerk line when the joint is broken or by pull imparted to the line.

From the foregoing it is obvious that I have provided an automatic cathead that is of extremely simple and compact construction and which is well adapted for its intended purpose.

What I claim and desire to secure by Letters Patent is:

1. A device of the character described including a jerk line, a stator member having a circumferential face providing a track for the jerk line, a driving member having a circumferential face disposed laterally relative to the circumferential face of the stator member and substantially corresponding in diameter with said face on the stator member for forming a track laterally disposed with respect to the track on the stator member, means supporting said members in coaxial relation with said faces in lateral registry, a transfer mechanism for transferring laterally the line from alignment with said track into alignment with the face of the driving member, a pickup on the driving member for carrying the line about the face of said member, and disengaging means extending into the path of the pickup for releasing the line from the pickup for return to said track.

2. A device of the character described including a jerk line, a stator having a circumferential face providing a track for the line, a rotor having a circumferential face disposed laterally relative to the circumferential face of the stator and substantially corresponding in diameter with the face of the stator for winding the jerk line thereon, means for supporting the stator coaxially of the rotor with said faces in substantial registry and in said lateral relation, a transfer mechanism on said stator for transferring the line laterally into alignment with the face of the rotor, a pickup on the rotor for carrying the line about the face of said rotor, and a deflector on said stator and extending laterally into the path of the pickup for disengaging the line for deflecting the line onto the face of the stator for return to starting position.

3. A device of the character described including a jerk line, a member having a circumferential track for said line, a driving member having a circumferential face substantially corresponding in diameter with the track for winding the jerk line thereon, means for supporting the member having the track with said track in substantially coaxial side-to-side registry with the annular face of the driving member, a transfer mechanism for transferring the line into alignment with the face of the driving member, a line pickup on the driving member for carrying the line about the face of the driving member, a deflector extending into the path of the pickup to disengage the line from the pickup, and a shock absorbing element between the supporting means and the member supported thereby.

4. A device of the character described including a jerk line, a knob on the end of the jerk line, a stator having a circumferential face providing a track for the knob and having check and rest stations for the knob at respective ends of the track, a rotor having a circumferential face substantially corresponding in diameter with the face of the stator for winding the jerk line thereon, means for supporting the stator in substantially coaxial side-to-side registry with the rotor, a transfer mechanism at the rest station of said stator for transferring the knob from said rest station of the stator into alignment with the face of the rotor, a knob pickup on the rotor for carrying the line about the face of the rotor, and a deflector adjacent the check station on said stator and extending into the path of the knob when engaged by said pickup to disengage the knob from the pickup and deflect the knob into the check station for return about the face of said stator to the rest station.

5. A device of the character described including a jerk line, a knob on the end of the jerk line, a stator having a circumferential face providing a track for the knob and having check and rest stations for the knob at respective ends of the track, a rotor having a circumferential face substantially corresponding in diameter with the face of the stator for winding the jerk line thereon, means for supporting the stator in substantially coaxial side-to-side registry with the rotor, a transfer mechanism at the rest station of said stator for transferring the knob from said rest station on the stator into alignment with the face of the rotor, a knob pickup on the rotor for carrying the line about the face of the rotor, a deflector adjacent the check station on said stator and extending into the path of the knob when engaged by said pickup to disengage the knob from the pickup and deflect the knob into the check station for return about the face of said stator to the rest station, and a circumferential guard on the stator extending over said faces and cooperating therewith to form enclosed ways for the knob, said guard having an opening for passing the jerk line.

6. A device of the character described including a jerk line, a knob on the end of the jerk line, a stator having a circumferential face providing a track for the knob and having check and rest stations for the knob at respective ends of the track, a rotor having a circumferential face substantially corresponding in diameter with the face of the stator for winding the jerk line thereon, means for supporting the stator in substantially coaxial side-to-side registry with the rotor, a transfer mechanism at the rest station of said stator for transferring the knob from said rest station on the stator into alignment with the face of the rotor, a knob pickup on the rotor for charrying the line about the face of the rotor, a deflector adjacent the check station on said stator and extending into the path of the knob when engaged by said pickup to disengage the knob from the pickup and deflect the knob into the check station for return about the face of said stator to the rest station, and a resilient pad between the stator and said supporting means.

7. A device of the character described including a jerk line, a knob on the end of the jerk line, a stator having a circumferential track for the knob, a stop member on the stator having check and rest faces on opposite sides thereof and providing ends for the track, a rotor having a circumferential face substantially corresponding in diameter with the face of the stator for winding the jerk line thereon and having an annularly grooved flange at a side of the annular face opposed to said track, means for supporting the stator substantially coaxial with the rotor with the track in registry with the annular face of the rotor, a transfer mechanism at the rest station of said stator for transferring the knob from said rest station on the stator into alignment with the face of the rotor, a knob pickup on the rotor for carrying the line about the face of the rotor, and a deflector carried by the stop member and extending over the face of the rotor into the groove of the flange for disengaging the knob from the pickup and for deflecting the knob into the check station for return about the track of the stator to the rest station.

8. A device of the character described including a jerk line, a knob on the end of the jerk line, a stator having a circumferential face providing a track for the knob and having check and rest stations for the knob at respective ends of the track, a rotor having a circumferential face substantially corresponding in diameter with the face of the stator for winding the jerk line thereon, a flange on the rotor extending radially from said face and having an annular groove, means for supporting the stator in substantially coaxial side-to-side registry with the rotor, a transfer mechanism at the rest station of said stator for transferring the knob from said rest station on the stator into alignment with the face of the rotor, radially spaced laterally extending lugs projecting from the rotor on opposite sides of the groove for engaging the knob and for carrying the line therebetween, about the face of the rotor, and a deflector adjacent the check station on said stator and extending across the path of the knob and into said groove to disengage the knob from the pickup and deflect the knob into the check station for return about the face of said stator to the rest station.

9. A device of the character described including a jerk line, a knob on the end of the jerk line, a stator having a circumferential face providing a track for the knob and having check and rest stations for the knob at respective ends of the track, a rotor having a circumferential face substantially corresponding in diameter with the face of the stator for winding the jerk line thereon, a flange on the rotor extending radially from said face and having an annular groove, means for supporting the stator in substantially coaxial side-to-side registry with the rotor, a transfer mechanism at the rest station of said stator for transferring the knob from said rest station on the stator into alignment with the face of the rotor, radially spaced laterally extending lugs projecting from the rotor on opposite sides of the groove for engaging the knob and for carrying the line therebetween about the face of the rotor, a deflector adjacent the check station on said stator and extending across the path of the knob when engaged by said pickup to disengage the knob from the pick up and deflect the knob into the check station for return about the face of said stator to the rest station, and a circumferential guard on the stator extending over said faces and cooperating therewith to form enclosed ways for the knob, said guard having an opening for passing the jerk line.

10. A device of the character described including a jerk line, a knob, means for swiveling the knob on the end of the jerk line, a stator having a circumferential track for the knob, a stop having check and rest faces forming respective ends of the track, a rotor having a circumferential face substantially corresponding in diameter with the face of the stator for winding the jerk line thereon, means for supporting the stator in substantially coaxial side-to-side registry with the rotor, a transfer mechanism associated with said stator for rolling the swivel mounted knob from engagement with said rest face on the stator into alignment with the circumferential face of the rotor, a knob pickup on the rotor for carrying the line about the face of the rotor, and a deflector adjacent the check station on said stator and extending into the path of said swivel mounted knob to disengage the knob from the pickup and to roll the knob onto the track into position to engage said check face.

11. A device of the character described including a jerk line, a knob, means for swiveling the knob on an end of the jerk line, a stator having a track for the knob and having check and rest stations for the knob at respective ends of the track, a rotor having a circumferential face substantially corresponding in diameter with the face of the stator for winding the jerk line thereon, means for supporting the stator in substantially coaxial side-to-side registry with the rotor, and means for rolling the knob from the track of the stator to the face of said rotor.

12. A device of the character described including a jerk line, a stator member having substantially concentric inner and outer circumferential tracks for the jerk line, the outer of said tracks having a portion offset laterally of the inner track, a driving member having a circumferential face substantially corresponding in diameter with the inner of said tracks for winding the jerk line thereon, means supporting said members in coaxial relation with the inner of said tracks in lateral registry, with the circumferential face of the driving member and with said circumferential face encircled by the lateral portion of the outer of said tracks, a transfer mechanism for transferring the line from said track onto said circumferential face of the driving member, a pickup on the driving member for carrying the line about the face of said member, and disengaging means extending into the path of the pickup for releasing the line from the pickup for return to said inner track.

ORREN M. GAHAGAN.

REFERENCES CITED

The following references are of record in the file of this patent:

UNITED STATES PATENTS

| Number | Name | Date |
|---|---|---|
| Re. 18,789 | Gahagan | Apr. 4, 1933 |
| 2,124,129 | Therolf | July 19, 1938 |
| 2,182,292 | Guier | Dec. 5, 1939 |
| 2,185,921 | McNaught | Jan. 2, 1940 |
| 2,247,518 | Owen | July 1, 1941 |
| 2,314,733 | Owen | Mar. 23, 1943 |
| 2,339,671 | Bergman | Jan. 18, 1944 |